United States Patent [19]

Towsend

[11] 4,357,043
[45] Nov. 2, 1982

[54] COMBINED BRUSH AND CUTTER ATTACHMENT FOR A SHOVEL BLADE

[76] Inventor: Marvin S. Towsend, 1365 Potomac Heights Dr., Oxon Hill, Md. 20022

[21] Appl. No.: 217,696

[22] Filed: Dec. 18, 1980

[51] Int. Cl.³ .............................................. A01B 1/20
[52] U.S. Cl. ...................................... 294/59; 294/51; 15/111; 30/329
[58] Field of Search .................. 294/51, 59, 54, 2, 49; 15/111; 37/53; 30/169, 280, 329

[56] References Cited

U.S. PATENT DOCUMENTS

| | | | |
|---|---|---|---|
| 1,935,510 | 11/1933 | Lofton | 294/51 |
| 3,733,636 | 5/1973 | Osadsky | 294/51 |
| 3,868,775 | 3/1975 | Anderson | 294/59 |
| 4,153,287 | 5/1979 | Towsend | 294/51 |

*Primary Examiner*—James B. Marbert

[57] ABSTRACT

The object of the invention is to provide a shovel blade attachment having both a brush and a cutter secured to the shovel blade by a common attaching assembly. Modifications of the shovel blade, such as drilled holes, are not required. Any conventional snow shovel can be readily converted into a shoveling, brushing, and cutting implement by employing the attachment of the invention.

Said attachment (1) is secured to the shovel blade (2). Said attachment (1) includes a brush (3), a cutter (4), and an attaching assembly (5). The cutter (4) has slots (12) or (13) for adjusting the exposure of the cutter (4) in contact with the shovel blade (2) in order that the shovel blade (2) absorb impact forces.

Compression pads (9) help secure the attachment (1) to the shovel blade (2) and provide clearance (19) between a clamping plate (8) and an upturned end (20) of the shovel blade (2). Pads (9) also provide clearance (21) between the brush (3) and a shovel blade indentation (22) and clearance (23) between the brush (3) and a handle (17).

A portion of clamping plate (8) may be sharpened into a cutting edge (27). A cutter (4) may be attached to the brush (3) in order that the brush (3) absorb impact forces.

10 Claims, 9 Drawing Figures

COMBINED BRUSH AND CUTTER ATTACHMENT FOR A SHOVEL BLADE

DESCRIPTION

TECHNICAL FIELD

The invention relates to devices for shoveling snow and the like. More specifically, it relates to an attachment for a shovel blade to facilitate removal of snow and ice from walkways, road surfaces, and the like.

BACKGROUND ART

My U.S. Pat. No. 4,153,287 for Shovel Blade, issued May 8, 1979 discloses a snow shovel having an attached brush with semirigid bristles projecting from the lower surface of the shovel blade. The patent discloses that the semirigid bristles can serve as ice choppers when the shovel is wielded vertically against ice on the surface to be cleared.

Two additional patents in the prior art disclose shovels particularly useful for chopping ice. In U.S. Pat. No. 1,124,046 of Lopez et al, ax blades are fixed upon the upper surface of a shovels blade using bolts which pass through holes in both the ax blade and the shovel blade. In U.S. Pat. No. 2,102,133 of Schoenberger, an ax bit in the form of a sleeve is placed over the rear corner of the shovel blade and secured by a pressure fit, precluding the need for holes in the shovel blade.

At times a rigid ice chopper is more effective in chopping ice than are the semirigid bristles of the brush in U.S. Pat. No. 4,153,287. However, addition of independently attached ax blades or bits as shown in U.S. Pat. Nos. 1,124,046 and 2,102,133 to the shovel blade of U.S. Pat. No. 4,153,287 would be undesirable for several reasons. Use of the ax blade in Pat. No. 1,124,046 would necessitate additional holes to be drilled in the shovel blade. Use of the ax bits in Pat. 2,102,133 would require additional separate fasteners. Furthermore, the ax bits and the clamps (shown in FIG. 5 of Pat. 4,153,287) would both project from the sides of the shovel blade at different positions.

Use of the ax blades or bits for chopping ice requires rotation of the shovel blade 90 degrees around the axis of the handle. Chopping is accomplished by raising and lowering the shovel blade through a wide range of chopping angles for impacting the cutting edge with the surface to be cleared. If both ax bits and brush clamps project from the sides of the shovel blade at different positions, the wielding of the shovel blade for chopping ice on the surface to be cleared is restricted to a limited range of chopping angles within which the clamps are not impacted against the surface. If the clamps are impacted, they may undergo damage and may loosen their grip on the brush and shovel blade.

DISCLOSURE OF INVENTION

In view of the deficiencies and inadequacies described above, it is an object of the invention to provide a shovel blade attachment having both a brush and a rigid cutter for ice.

Another object of the invention is to provide a combined brush and cutter attachment which does not require additional holes to be drilled in the shovel blade to accommodate the cutter.

Still another object of the invention is to provide a combined brush and cutter attachment which attaches to a shovel blade without employing additional fasteners for the cutter.

Yet another object of the invention is to provide a combined brush and cutter attachment for a shovel blade allowing impacting of the surface to be cleared through a wide range of chopping angles without resultant damage to the clamps fixing the brush to the shovel blade.

Another object of the invention is to provide a combined brush and cutter attachment for a shovel blade enabling any conventional snow shovel to be readily converted into an improved snow and ice clearing implement without the need for altering the shovel blade itself.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the combined brush and cutter attachment for a shovel blade of this invention may comprise a brush, a cutter, and an attaching assembly for attaching the brush and cutter to the shovel blade.

A preferred embodiment of the invention provides that the rear side of the cutter is placed along the side of the shovel blade. Thereby, impact forces of the cutter against the surface to be cleared are absorbed by the shovel blade. Absorbing impact forces by the shovel blade is preferable to absorbing impact forces by the attaching assembly because the attaching assembly components are less massive and more easily damaged than the more massive shovel blade.

The cutter may be provided with a slot allowing adjustment of the cutter for changes in cutting edge exposure and for placing the rear side of the cutter snugly against the shovel blade. The cutter and shovel blade are secured together by a component of the attaching assembly having a first clamping portion pressing the shovel blade and a second clamping portion pressing the cutter.

Preferably, pads of material having the properties of high compressive strength, flexibility, and non-slipability are placed between the attaching assembly and the shovel blade and between the brush and the shovel blade. Tough synthetic rubber material has been found suitable for the compression pads.

The compression pads facilitate a secure attachment of the invention to the shovel blade. The compression pads may also serve an additional function. When the shovel blade has an upturned side which obstructs effective use of the attaching assembly, or when an identation in the shovel blade (such as commonly provided to increase strength in a curved blade) or a handle which is attached to the shovel blade obstructs secure placement of the brush, compression pads may be used to provide clearances between the upturned side and the attaching assembly, between the identation and the brush, and between the handle and the brush. Providing adequate clearances allows effective use of the attaching assembly and effective placement of the brush.

Several alternative embodiments of the invention are contemplated. In one embodiment, a portion of the cutter is located along the side of the brush thereby causing the brush to absorb cutting impact forces.

In another embodiment of the invention, a portion of the attaching assembly is sharpened to serve as a cutter. Thus, the attaching assembly serves as a combined fastener and cutter.

In yet another embodiment of the invention, the cutter is located between the brush and the shovel blade.

An especially desirable benefit obtained from using the combined brush and cutter attachment of the invention is the ease of converting any conventional snow shovel into an improved snow and ice clearing implement without need for altering the shovel blade itself.

BRIEF DESCRIPTION OF DRAWINGS

The accompanying drawings, which are incorporated in and form a part of the specification, illustrate several embodiments of the present invention and, together with the description, serve to explain the principles of the invention.

BEST MODE FOR CARRYING OUT THE INVENTION

Figure 1:
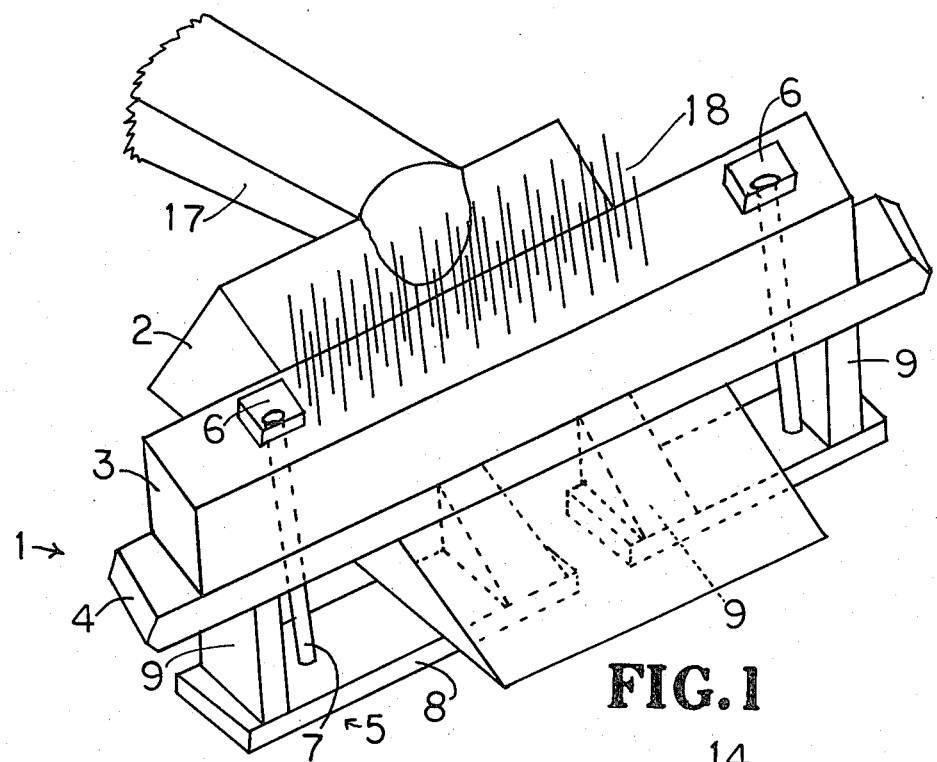
FIG. 1 is a perspective view of one embodiment of the invention attached to a shovel blade.

Referring to the drawing, in FIG. 1, combined brush and cutter attachment 1 for shovel blade 2 includes brush 3, cutter plate 4, and an attaching assembly 5 including nuts 6, bolts 7, and clamp plates 8. Compression pads 9 are placed between the cutter plate 4 and the clamp plates 8 to facilitate effective clamping of the attachment 1 to the shovel blade 2.

In this embodiment, the attachment 1 is attached to the shovel blade 2 without drilling holes in the shovel blade. Clamping pressure alone exerted by the attaching assembly 5 secures the attachment 1 to the shovel blade 2. The same attaching assembly 5 secures both the brush 3 and the cutter plate 4 to the shovel blade 2 without need for separate fasteners for the brush and the cutter plate.

Brush 3 of the invention, having semirigid bristles 18, is used in substantially the same manner as the brush disclosed in the above mentioned Shovel Blade, U.S. Pat. No. 4,153,287 which is incorporated herein by reference. The features relating to control of the angle of attack of the leading edge of the shovel blade; the scraping and brushing of the surface to be cleared; and the chopping of ice by the semirigid bristles 18 are the same in the instant invention as they are in Patent 4,153,287.

Rigid cutter plate 4 of the instant invention is used by rotating the shovel blade 2 a quarter turn (90 degrees) around the axis of the handle 17. Chopping ice is accomplished by raising and lowering the shovel blade 2 and impacting the surface to be cleared by the cutting edge of the cutter plate 4.

Figure 2:
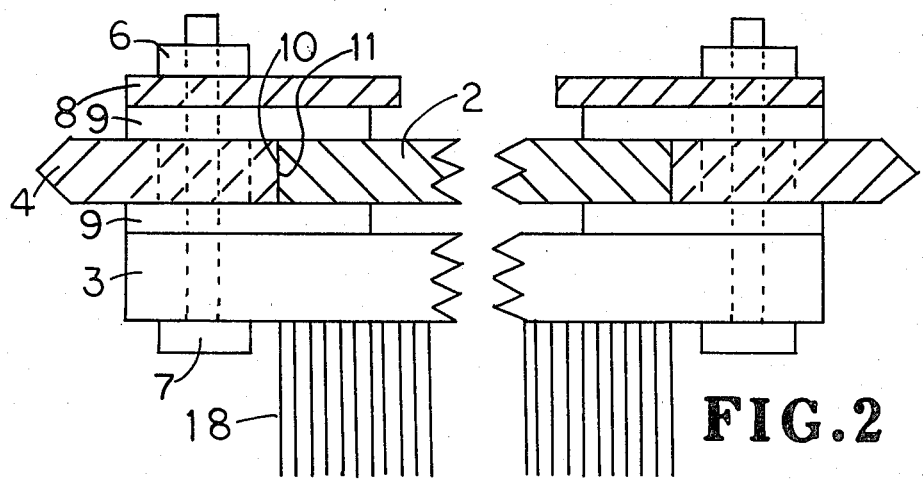
FIG. 2 is a partial cross sectional view of an embodiment of the invention having a cutting plate contacting the side of the shovel blade.

In FIG. 2, in accordance with another aspect of the invention, cutter plates 4 have their rear sides 10 placed along corresponding portions of sides 11 of the shovel blade 2. Thereby, impact forces of the cutter plates 4 against the surface to be cleared are absorbed by corresponding portions of the shovel blade 2.

Figures 3A, 3B:
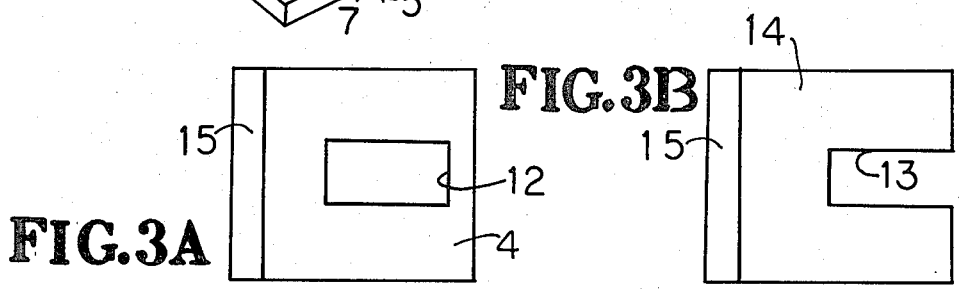
FIGS. 3A and 3B show slotted cutting plates.

In a preferred aspect of the invention, as shown in FIGS. 3A and 3B, cutter plates 4 and 14 are provided with slots. Slot 12 is closed on all sides. Slot 13 is open on one side. The slots 12 and 13 allow adjustment of the cutter plates 4 and 14 for changes in exposure of cutting edges 15. The slots 12 and 13 also allow adjustment of the cutter plates 4 and 14 to fit snugly against the side 11 of the shovel blade 2.

Figure 4:
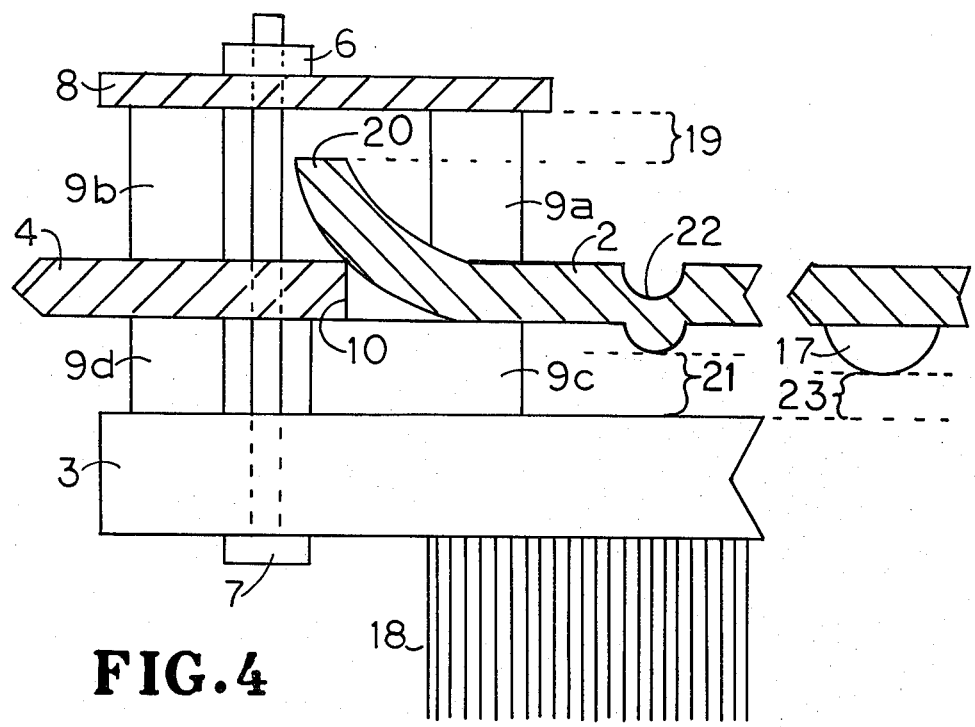
FIG. 4 is a partial cross sectional view of an embodiment of the invention adapted to a shovel blade having an upturned side, an indentation, and a handle.

In accordance with another aspect of the invention, as shown in FIG. 4, compression pads 9 are used to secure the attachment 1 of the invention to the shovel blade 2. Compression pad 9a is placed between the clamp plate 8 and the shovel blade 2; compression pad 9b, between the clamp plate 8 and the cutter plate 4; pad 9c, between the brush 3 and the shovel blade 2; and pad 9d, between the brush 3 and the cutter plate 4. Pads 9a and 9b are sufficiently high to allow a first clearance 19 between the clamp plate 8 and the upturned end 20 of the shovel blade 2. Pads 9c and 9d are sufficiently high to allow a second clearance 21 between an indentation 22 in the shovel blade 2 and the brush 3 and a third clearance 23 between the handle 17 attached to the shovel blade 2 and the brush 3. Providing adequate clearances 19, 21, and 23 allows effective use of the clamping plate 4 of the attaching assembly and effective placement of the brush 3.

Figure 5:
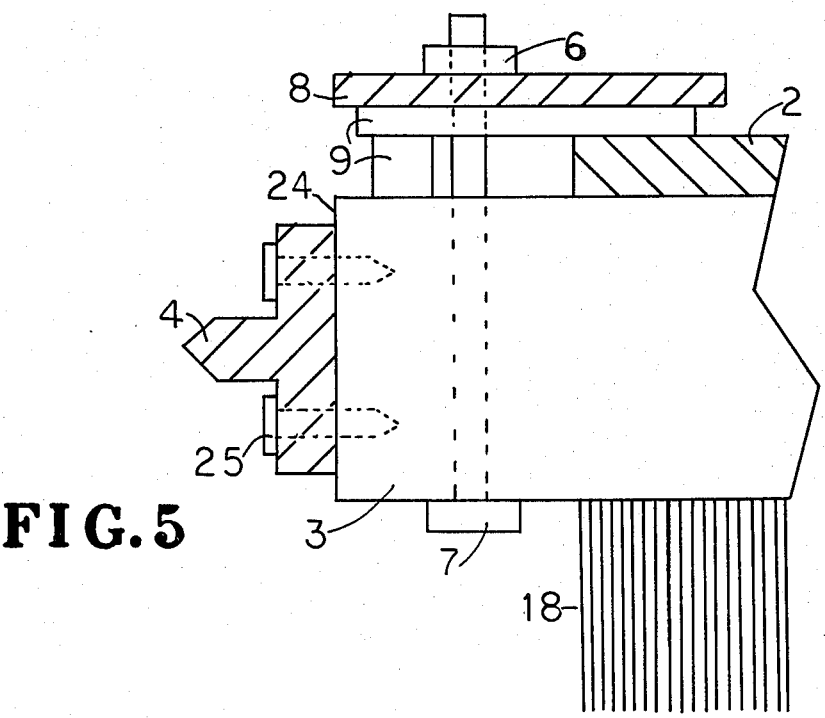
FIG. 5 is a partial cross sectional view of an embodiment of the invention having a cutting member attached to the brush.

In accordance with another embodiment of the invention, as shown in FIG. 5, cutter plate 4 is attached to side 24 of the brush 3 by nails 25. In this embodiment, the brush 3 absorbs cutting impact forces of the cutter plate 4 against the surface to be cleared.

Figure 6:
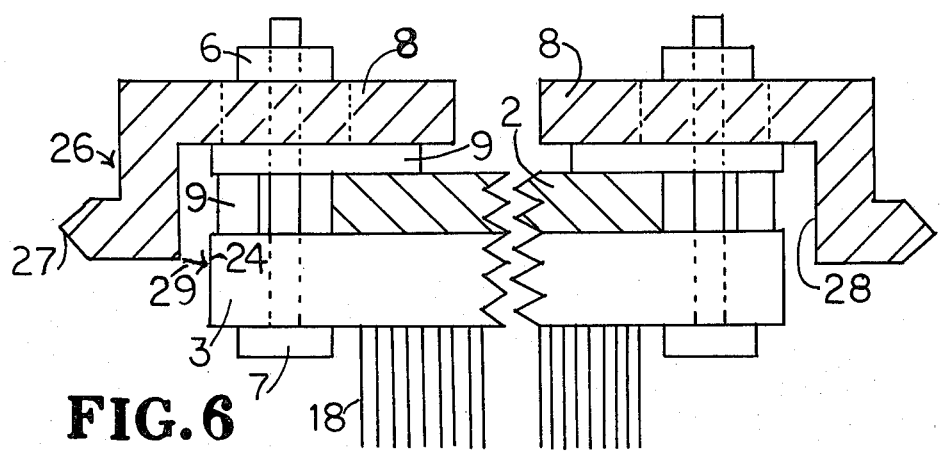
FIG. 6 is a partial cross sectional view of an embodiment of the invention having a cutting edge formed on a clamping member.

FIG. 6 discloses yet another embodiment of the invention. Here, clamp plate 8 has an S-shaped bend 26 with a cutting edge 27 at the end of the bend. Thus, the clamp plate 8 of the attaching assembly serves as a combined fastener and cutter. Portion 28 of clamp plate 8 may extend downwardly to be adjacent to the side 24 of the brush 3. In this way, the brush 3 absorbs a portion of the impact forces of the cutting edge 27 against the surface to be cleared. Impact forces are absorbed firstly by the clamp plate 8 itself as it is flexed along arc 29. When impact forces drive portion 28 completely through arc 29 to contact side 24 of the brush 3, then the brush 3 absorbs the remaining impact forces.

Figure 7:
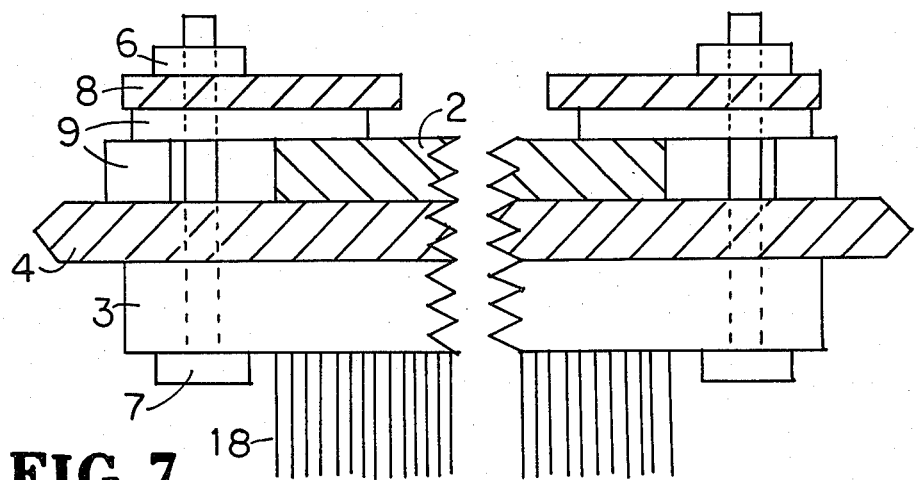
FIG. 7 is a partial cross sectional view of an embodiment of the invention having a cutting plate between the brush and the shovel blade.

In FIG. 7, in accordance with another aspect of the invention, cutter plate 4 extends the full length of the shovel blade 2 and is located between the brush 3 and the shovel blade 2.

In the embodiments of the invention described thus far, the attaching assembly 5 for clamping the brush 3 to the shovel blade 2 and the cutter plate 4 to the shovel blade are one and the same. There is no problem, therefore, of a brush clamp being in the way of the cutter when the cutter is impacted with the surface to be cleared. The range of chopping angles is, therefore, very wide as a result of not being restricted by a separate brush clamp.

In the embodiments of the invention shown and described thus far, the shovel blade 2 itself need not be altered in order to fasten the combined brush and cutter attachment 1 of the invention thus permitting any conventional snow shovel to converted into an improved snow and ice clearing implement with relative ease. Specifically, no holes need to be drilled in the shovel blade 2.

Figure 8:
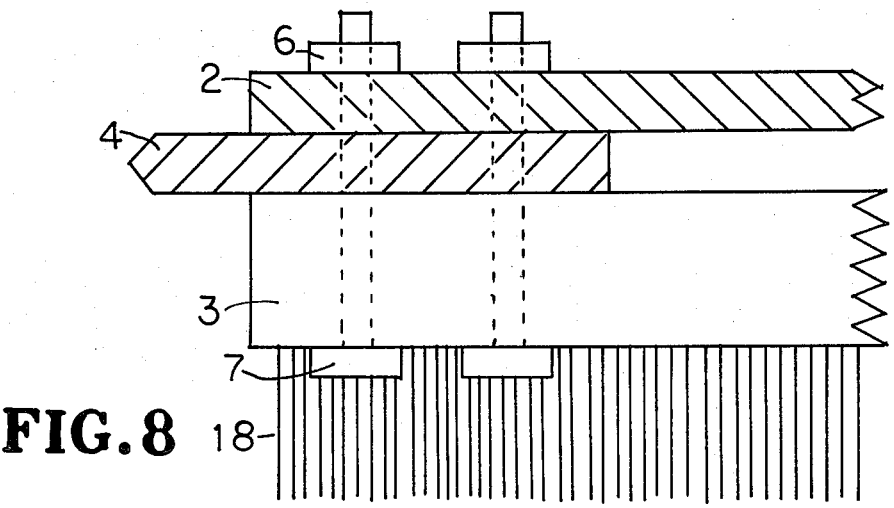
FIG. 8 is a partial cross sectional view of an embodiment of the invention attached by bolts passing through holes in the shovel blade.

In U.S. Pat. No. 4,153,287 mentioned above, shovel blades are disclosed having holes for receipt of attaching bolts for attaching the brush to the shovel blade. The present invention may also be employed with shovel blades of this type. As shown in FIG. 8, cutter plate 4 is located between brush 3 and shovel blade 2. Nuts 6 secure bolts 7 which pass through the brush 3, through the cutter plate 4, and through the shovel blade 2. It is emphasized that the same nuts 6 and bolts 7 secure both the brush 3 and the cutter plate 4 to the shovel blade 2.

Furthermore, a shovel blade such as shown in Patent 4,153,287 in FIG. 1 employing nuts and bolts for attaching a brush need not be further modified in order to accommodate the attachment 1 of the instant invention. The same nuts, bolts, holes in the shovel blade, and holes in the brush can be used for attaching the instant cutter plates 4.

The foregoing description of the preferred embodiments and the additional embodiments of the invention has been presented for purposes of illustration and description. It is not intended to be exhaustive or to limit the invention to the precise forms disclosed. Obvious modifications and variations are possible in light of the above teaching, for example: the components of the attaching assembly 5 as well as the semirigid bristles 18 of the brush may be made from non-ferrous metals, thus not susceptible to rust formation; compression pads 9 may be made from tough synthetic rubbers such as used in the casing of pneumatic tires; cutter plates 4 may be made from aluminum; and the attaching assembly 5 may include a conventional C-clamp.

The embodiments were chosen and described in order to best explain the principles of the invention and its practical application to thereby enable others skilled in the art to best utilize the invention in various embodiments and with various modifications as are suited in the particular use contemplated. It is intended that the scope of the invention be defined by the claims appended thereto.

I claim:

1. For a shovel blade having a handle, an attachment, comprising:
    a brush having a bristle support and bristles attached thereon, said bristles extending perpendicularly to said bristle support;
    at least one cutting plate means having a cutting edge, said plate attached below said bristle support; and
    means for rigidly attaching both said plate and said bristle support to the shovel blade, said attaching means being at least two spaced bolts extending through holes through said plate and said bristle support attaching said elements together.

2. A shovel blade attachment as described in claim 1 wherein the rear side of said cutting means is located along corresponding portions of the side of the shovel blade thereby causing the corresponding portions of the side of the shovel blade to absorb cutting impact forces.

3. A shovel blade attachment as described in claim 1 wherein said cutting means has a slot for adjusting exposure of said cutting means.

4. A shovel blade attachment as described in claim 1 wherein said cutting means has a slot for adjusting said cutting means for contacting a side of the shovel blade.

5. A shovel blade attachment as described in claim 1 further including an upper clamp plate having a first clamping portion pressing the shovel blade and a second clamping portion pressing said cutting means.

6. A shovel blade attachment as described in claim 5, further comprising compression pad means contacting the shovel blade and secured by said clamp plate.

7. A shovel blade attachment as described in claim 6 wherein said compression pads provide clearance between the shovel blade an said clamp plate.

8. A shovel blade attachment as describe in claim 6 wherein said compression pads provide clearance between the shovel blade and said brush.

9. A shovel blade attachment as described in claim 1 further including an upper clamp plate having a cutting portion, said clamp plate with said cutting portion serving as a combined attaching and cutting means; and
    wherein said combined attaching and cutting means has a downwardly extending portion adjacent to the side of said brush thereby allowing said brush to absorb a portion of the impact forces of said combined attaching and cutting means.

10. A shovel blade attachment as described in claim 1 wherein said cutting means is located between said brush and the shovel blade.

* * * * *